United States Patent
Roy et al.

(10) Patent No.: US 11,496,338 B2
(45) Date of Patent: Nov. 8, 2022

(54) METHOD AND APPARATUS FOR BEAMFORMING

(71) Applicant: NXP USA, Inc., Austin, TX (US)

(72) Inventors: Sayak Roy, Kolkata (IN); Ankit Sethi, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/374,936

(22) Filed: Jul. 13, 2021

(65) Prior Publication Data

US 2022/0021560 A1  Jan. 20, 2022

(30) Foreign Application Priority Data

Jul. 14, 2020 (IN) .............................. 202021030011

(51) Int. Cl.
*H04L 25/02* (2006.01)
*H04B 7/06* (2006.01)

(52) U.S. Cl.
CPC ....... *H04L 25/0224* (2013.01); *H04B 7/0617* (2013.01); *H04B 7/0634* (2013.01); *H04L 25/0242* (2013.01)

(58) Field of Classification Search
CPC ............. H04L 25/0224; H04L 25/0242; H04L 25/0248; H04B 7/0617; H04B 7/0634; H04B 7/0626
See application file for complete search history.

(56) References Cited

U.S. PATENT DOCUMENTS

| | | | |
|---|---|---|---|
| 8,023,457 B2 | 9/2011 | Kotecha et al. | |
| 8,340,597 B1 | 12/2012 | Nabar et al. | |
| 8,797,948 B2 | 8/2014 | Anwyl et al. | |
| 9,154,211 B2 | 10/2015 | Sampath et al. | |
| 9,312,939 B2 * | 4/2016 | Nabar | H04B 7/0417 |
| 9,979,446 B2 | 5/2018 | Xia et al. | |
| 10,601,486 B1 | 3/2020 | Roy et al. | |
| 2011/0310827 A1* | 12/2011 | Srinivasa | H04B 7/0634 370/328 |
| 2019/0132034 A1 | 5/2019 | Yun et al. | |
| 2020/0112353 A1 | 4/2020 | Liu | |

FOREIGN PATENT DOCUMENTS

KR  20150118897 A  10/2015

* cited by examiner

*Primary Examiner* — Sung S Ahn

(57) ABSTRACT

Embodiments of a method and an apparatus for beamforming are disclosed. In an embodiment, a method for beamforming involves transmitting, by a beamformer to a beamformee, a sounding packet that includes training symbols, receiving, at the beamformee, the sounding packet that includes the training symbols, deriving, at the beamformee, channel estimates from the training symbols included in the sounding packet, computing, at the beamformee, a feedback matrix from the derived channel estimates, transmitting, by the beamformee to the beamformer, a packet that includes two sets of symbols, where the feedback matrix is applied to at least one of the two sets of symbols, receiving, at the beamformer, the packet that includes the two sets of symbols, and operating the beamformer according to the two sets of symbols included in the packet.

20 Claims, 8 Drawing Sheets

METHOD AND APPARATUS FOR BEAMFORMING

CROSS-REFERENCE TO RELATED APPLICATIONS

This application is entitled to the benefit of India Provisional Patent Application Serial Number 202021030011, filed on Jul. 14, 2020, which is incorporated by reference herein.

BACKGROUND

In beamforming systems, beamforming devices, e.g., beamformers or beamformees, can exchange wireless information and execute various wireless operations in response to the wireless information. As an example, symbols may be transmitted via packets by a beamformer to a beamformee to help direct beam steering in subsequent packet transmissions. In such an example, an implicit beamforming technique or an explicit beamforming technique may be used to support beamforming between the beamformer and the beamformee. However, because the implicit beamforming technique and/or the explicit beamforming technique may not be able to easily support devices with large number of antennas (e.g., 16 antennas), beamforming systems may experience limited performance and range capabilities.

SUMMARY

Embodiments of a method and an apparatus for beamforming are disclosed. In an embodiment, a method for beamforming involves transmitting, by a beamformer to a beamformee, a sounding packet that includes training symbols, receiving, at the beamformee, the sounding packet that includes the training symbols, deriving, at the beamformee, channel estimates from the training symbols included in the sounding packet, computing, at the beamformee, a feedback matrix from the derived channel estimates, transmitting, by the beamformee to the beamformer, a packet that includes two sets of symbols, where the feedback matrix is applied to at least one of the two sets of symbols, receiving, at the beamformer, the packet that includes the two sets of symbols, and operating the beamformer according to the two sets of symbols included in the packet.

In an embodiment, the sounding packet includes at least as many training symbols as a number of antennas at the beamformer ($N_{Tx}$).

In an embodiment, the feedback matrix includes right singular vectors derived from the channel estimates.

In an embodiment, the beamformer directs beam steering to the beamformee using the right singular vectors derived from the channel estimates.

In an embodiment, the packet that includes the two sets of symbols includes a first set of symbols that include a sequence of training symbols, and a second set of symbols that include the sequence of training symbols included in the first set of symbols with the applied feedback matrix.

In an embodiment, columns of the applied feedback matrix are an orthonormal spatial spreading matrix, and where the beamformee applies another orthonormal matrix to the first set of symbols and applies the feedback matrix in addition to the orthonormal matrix to the second set of symbols.

In an embodiment, the first set of symbols includes at least as many training symbols as a number of spatial streams ($N_{SS}$) and the second set of symbols includes at least as many training symbols as $N_{Tx}$.

In an embodiment, columns of the applied feedback matrix are an orthonormal spatial spreading matrix.

In an embodiment, the packet that includes the two sets of symbols includes a first set of symbols that include a sequence of training symbols, and a second set of symbols that include the sequence of training symbols included in the first set of symbols with the applied orthonormal spatial spreading matrix.

In an embodiment, the beamformee applies another orthonormal matrix to the first set of symbols and applies the feedback matrix in addition to the orthonormal matrix to the second set of symbols.

In an embodiment, the first set of symbols includes at least as many training symbols as $N_{SS}$ and the second set of symbols includes at least as many training symbols as $N_{Tx}$.

In an embodiment, the beamformer computes two sets of channel coefficients from the packet that includes the two sets of symbols.

In an embodiment, the beamformer recovers the feedback matrix using the two sets of channel coefficients.

In an embodiment, recovering the feedback matrix using the two sets of channel coefficients includes computing a first orthonormal matrix by: deriving a first Hermitian transpose of a first channel coefficient matrix from at least one of the two sets of channel coefficients, deriving a first QR decomposition of the first Hermitian transpose to determine the first orthonormal matrix, computing a second orthonormal matrix by: deriving a second Hermitian transpose of a second channel coefficient matrix from at least one of the two sets of channel coefficients, deriving a second QR decomposition of the second Hermitian transpose to determine the second orthonormal matrix, and deriving a third matrix with orthogonal columns from the first orthonormal matrix and the second orthonormal matrix, where the third matrix is the feedback matrix.

In an embodiment, the beamformer selects corresponding columns from the second orthonormal matrix and post-multiplies a sub-matrix formed by the corresponding columns from the second orthonormal matrix with the first Hermitian transpose of the first orthonormal matrix to derive the third matrix with orthogonal columns.

In an embodiment, the training symbols included in the packet are Long Training Field (LTF) symbols.

In an embodiment, the first set of symbols is repeated N times and the second set of symbols is repeated M times, where N and M are integers greater than one.

In an embodiment, the beamformee transmits at least one data symbol that includes at least one sub-stream signal-to-noise ratio (SNR).

An embodiment of a beamforming system is also disclosed. The beamforming system includes a beamformer including a processor configured to: transmit a sounding packet that includes training symbols, receive a packet that includes two sets of symbols, operate according to the two sets of symbols included in the packet, a beamformee including a processor configured to: receive the sounding packet that includes the training symbols, derive channel estimates from the training symbols included in the sounding packet, compute a feedback matrix from the derived channel estimates, and transmit the packet that includes the two sets of symbols, where the feedback matrix is applied to at least one of the two sets of symbols.

An embodiment of a device is also disclosed. The device includes a processor configured to operate as a beamformer, where operating as a beamformer involves: transmitting a sounding packet that includes training symbols, receiving a packet that includes two sets of symbols, operating according to the two sets of symbols included in the packet, and operate as a beamformee, where operating as a beamformee involves: receiving the sounding packet that includes the training symbols, deriving channel estimates from the training symbols included in the sounding packet, computing a feedback matrix from the derived channel estimates, and transmitting the packet that includes the two sets of symbols, where the feedback matrix is applied to at least one of the two sets of symbols.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
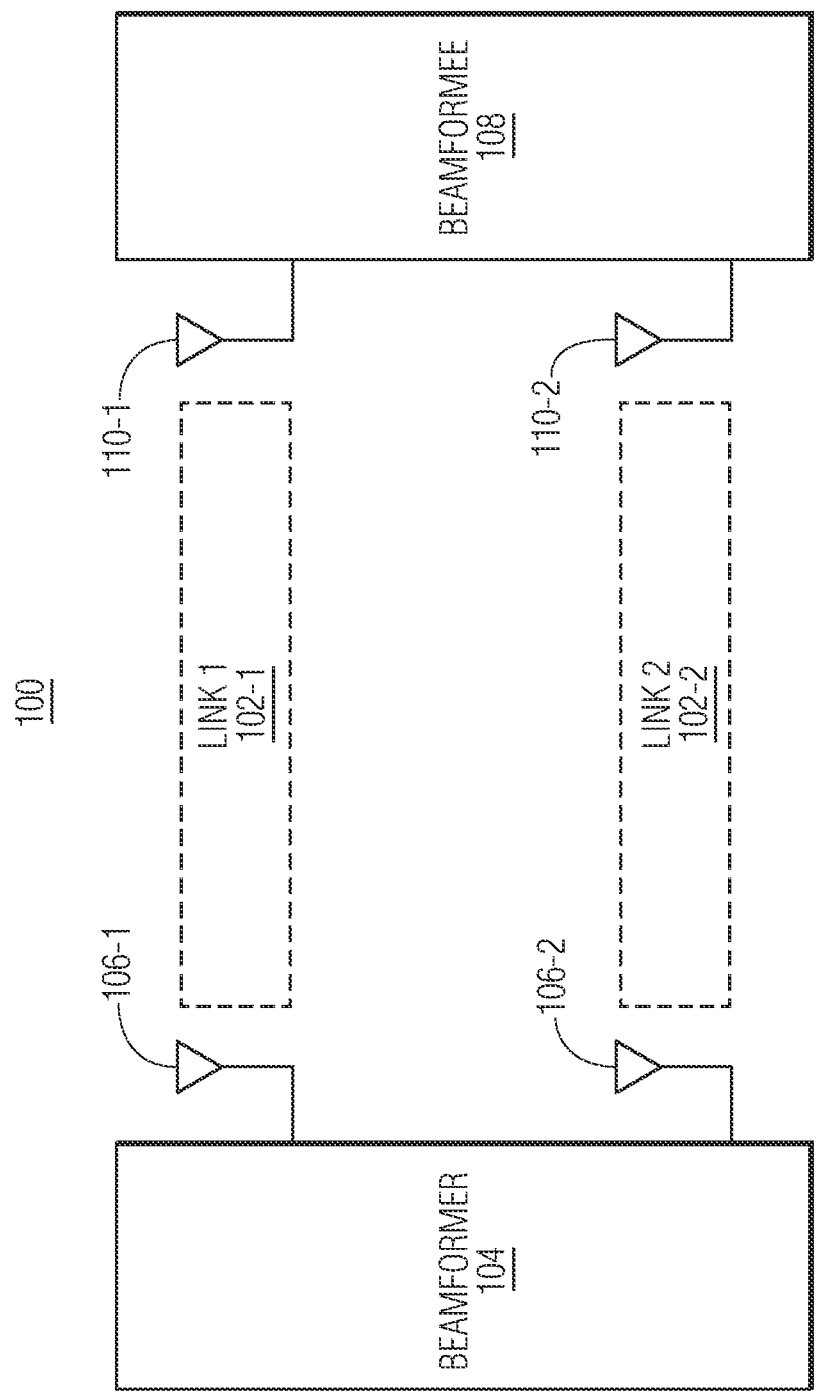
FIG. 1 depicts a beamforming system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a beamforming system (e.g., a wireless communications system), a device, e.g., a beamformer (e.g., an access point (AP) multi-link device (MLD) of a wireless local area network (WLAN)) may transmit data to at least one associated beamformee (e.g., a station (STA) MLD). The beamformer may be configured to operate with associated beamformees according to a communication protocol. For example, the communication protocol may be an Extremely High Throughput (EHT) communication protocol, or Institute of Electrical and Electronics Engineers (IEEE) 802.11be communication protocol. Features of beamforming and wireless communication systems operating in accordance with the EHT communication protocol and/or next-generation communication protocols may be referred to herein as "non-legacy" features. In some embodiments of the beamforming system described herein, different associated beamformees within range of a beamformer operating according to the EHT communication protocol may be configured to operate according to at least one other communication protocol, but may be affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a beamforming system 100 that is used for wireless (e.g., WiFi) communications. In the embodiment depicted in FIG. 1, the beamforming system includes one beamformer device, which is implemented as beamformer 104, and one beamformee device, which is implemented as beamformee 108. The beamforming system can be used in various applications, such as industrial applications, medical applications, computer applications, and/or consumer or enterprise applications. In some embodiments, the beamforming system is a wireless communications system, such as a wireless communications system compatible with an IEEE 802.11 protocol. For example, the beamforming system may be a wireless communications system compatible with the IEEE 802.11be protocol. Although the depicted beamforming system 100 is shown in FIG. 1 with certain components and described with certain functionality herein, other embodiments of the beamforming system may include fewer or more components to implement the same, less, or more functionality. For example, in some embodiments, the beamforming system includes a single beamformer with multiple beamformees, or multiple beamformers with more than one beamformee. In another example, although the beamforming system is shown in FIG. 1 as being connected in a certain topology, the network topology of the beamforming system is not limited to the topology shown in FIG. 1.

In the embodiment depicted in FIG. 1, the beamformer 104 includes two antennas, implemented as beamformer antennas 106-1 and 106-2. In such an embodiment, the beamformer antennas may be beamformer antenna-1 106-1 and beamformer antenna-2 106-2. In an embodiment, the beamformer antennas 106-1 and 106-2 may be transmit antennas, such that transmit antennas may transmit information to other devices. In another embodiment, the beamformer antennas 106-1 and 106-2 may be receive antennas, such that receive antennas may receive information from other devices. The beamformer antennas 106-1 and 106-2 may be implemented in hardware (e.g., circuits), software, firmware, or a combination thereof. The beamformer antennas 106-1 and 106-2 may be fully or partially implemented as part of an integrated circuit (IC) device. In some embodiments, the beamformer antennas 106-1 and 106-2 are implemented as part of wireless APs compatible with at least one WLAN communications protocol (e.g., at least one IEEE 802.11 protocol). For example, the beamformer antennas 106-1 and 106-2 may be part of wireless APs compatible with the IEEE 802.11be protocol.

In some embodiments, a beamformer (e.g., beamformer 104) connects to a local area network (e.g., a LAN) and/or to a backbone network (e.g., the Internet) through a wired connection and wirelessly connects to beamformees (e.g., wireless STAs), for example, through one or more WLAN communications protocols, such as the IEEE 802.11 protocol. In some embodiments, a beamformer (e.g., beamformer 104) includes at least one AP with at least one antenna (e.g., beamformer antenna-1 106-1 and/or beamformer antenna-2 106-2), at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. Although the beamformer 104 is shown in FIG. 1 as including two beamformer antennas, other embodiments of the beamformer 104 may include more than two beamformer antennas.

In the embodiment depicted in FIG. 1, the beamformee device, implemented as beamformee 108, includes two antennas which are implemented as beamformee antennas 110-1 and 110-2. In such an embodiment, the beamformee antennas may be beamformee antenna-1 110-1 and beamformee antenna-2 110-2. In an embodiment, the beamformee antennas 110-1 and 110-2 may be transmit antennas, such that transmit antennas may transmit information to other devices. In another embodiment, the beamformee antennas 110-1 and 110-2 may be receive antennas, such that receive antennas may receive information from other devices. The beamformee antennas 110-1 and 110-2 may be implemented in hardware (e.g., circuits), software, firmware, or a combination thereof. The beamformee antennas 110-1 and 110-2 may be fully or partially implemented as part of an IC device. In some embodiments, the beamformee 108 may be implemented as part of a wireless STA device that wirelessly connects to wireless APs. For example, the beamformee 108 may be implemented in a laptop, a desktop personal computer (PC), a mobile phone, or other communications device that supports at least one WLAN communications protocol. In some embodiments, the beamformee 108 may be a communications device compatible with at least one IEEE 802.11 protocol (e.g., the IEEE 802.11be protocol).

In some embodiments, the beamformee antennas 110-1 and 110-2 may be part of wireless STAs compatible with the IEEE 802.11be protocol. In some embodiments, a wireless STA may include at least one antenna (e.g., beamformee antenna-1 110-1 and/or beamformee antenna-2 110-2), at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver. Although the beamformee 108 is shown in FIG. 1 as including two beamformee antennas, other embodiments of the beamformee 108 may include one beamformee antenna or more than two beamformee antennas.

In the embodiment depicted in FIG. 1, the beamformee 108 communicates with the beamformer 104 via two communication links, e.g., link1 102-1 and link2 102-2. For example, each of the beamformee antennas 110-1 or 110-2 communicates with beamformer antennas 106-1 or 106-2 via corresponding communication links 102-1 or 102-2. In an embodiment, there may be four transmission paths (not shown), such that the four transmission paths may include transmissions from beamformer antenna-1 106-1 to beamformee antenna-1 110-1, transmissions from beamformer antenna-1 106-1 to beamformee antenna-2 110-2, transmissions from beamformer antenna-2 106-2 to beamformee antenna-2 110-2, and/or transmissions from beamformer antenna-2 106-2 to beamformee antenna-1 110-1. In such an embodiment, the four transmission paths may make up one communication link (not shown). In an embodiment, a communication link (e.g., link1 102-1 or link2 102-2) may include a Basic Service Set (BSS) operating channel established by a beamformer (e.g., beamformer 104) that features multiple 20 MHz channels used to transmit packets (e.g., sounding packets, feedback packets, etc.) between a first wireless device (e.g., beamformer 104) and a second wireless device (e.g., beamformee 108). As an example, a 20 MHz channel may include a number of spatial streams ($N_{SS}$) on which packets may be transmitted and/or received. In some embodiments, a 20 MHz channel may be a punctured 20 MHz channel or an unpunctured 20 MHz channel. In addition, although the beamformer 104 communicates (e.g., wirelessly communicates) with the beamformee 108 via multiple links 102-1 and 102-2, in other embodiments, the beamformer 104 may communicate (e.g., wirelessly communicate) with the beamformee 108 via one link or more than two communication links.

In some embodiments, beamforming systems (e.g., beamforming system 100) may support devices (e.g., a beamformer device and/or a beamformee device) with up to 16 antennas for throughput and/or range enhancement. To support beamforming between such devices in beamforming systems, the devices may use an implicit beamforming technique or an explicit beamforming technique. As an example, implicit beamforming may involve a beamformer deriving a steering matrix from packets transmitted by the beamformee, and explicit beamforming may involve a beamformee deriving a steering matrix to be used by the beamformer. However, in such embodiments, beamforming may be difficult for devices with up to 16 antennas as implicit beamforming may suffer from calibration issues at the device(s) and explicit beamforming may need feedback on a channel via a data payload in a feedback packet. Consequently, due to a large feedback packet size, increased spatial dimensions supported by non-legacy communication protocols (e.g., the IEEE 802.11be protocol) may cause significant feedback overhead when providing feedback on a channel. Thus, reducing overhead and/or calibration issues in beamforming systems may help improve beamforming techniques for devices communicating in a beamforming system.

In accordance with an embodiment of the invention, a technique for beamforming involves transmitting, by a beamformer to a beamformee, a sounding packet that includes training symbols, receiving, at the beamformee, the sounding packet that includes the training symbols, deriving, at the beamformee, channel estimates from the training symbols included in the sounding packet, computing, at the beamformee, a feedback matrix from the derived channel estimates, transmitting, by the beamformee to the beamformer, a packet that includes two sets of symbols, wherein the feedback matrix is applied to at least one of the two sets of symbols, receiving, at the beamformer, the packet that includes the two sets of symbols, and operating the beamformer according to the two sets of symbols included in the packet. In some embodiments, the feedback matrix includes right singular vectors derived from the channel estimates, such that the beamformer may direct beam steering to the beamformee using the right singular vectors derived from the channel estimates. By exchanging packets with symbols between the beamformer and the beamformee to direct beam steering in beamforming systems, the beamforming system may reduce overhead and/or calibration issues. Thus, reducing overhead and/or calibration issues in beamforming systems may help further enhance beamforming techniques for devices communicating in a beamforming system by improving device efficiency and/or performance.

An example of a beamformer and a beamformee exchanging packets in a beamforming system is described in further detail with reference to FIG. 2.

Figure 2:
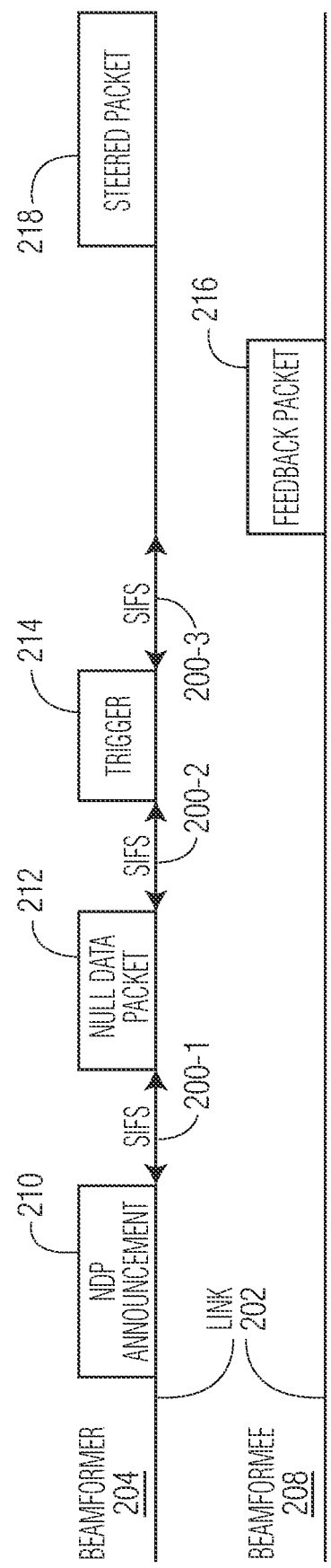
FIG. 2 illustrates an example of a beamformer and a beamformee exchanging packets in accordance with an embodiment of the invention.

FIG. 2 illustrates an example of a beamformer and a beamformee exchanging packets in accordance with an embodiment of the invention. In particular, FIG. 2 is shown as including a beamformer and a beamformee, implemented as beamformer 204 and beamformee 208, respectively. In an embodiment, the beamformer 204 and the beamformee 208 may be part of a beamforming system (e.g., beamforming system 100), such that the beamformer 204 and the beamformee 208 communicate via a link, implemented as link 202. With reference to FIG. 2, the beamformer 204 and the beamformee 208 may exchange packets via link 202 to direct beam steering in the beamforming system. In some embodiments, the beamformer 204 may transmit a Null Data Packet (NDP) Announcement packet 210 on link 202 to the beamformee 208. In such an embodiment, after a first Short Interframe Space (SIFS) time 200-1, the beamformer 204 may transmit an NDP packet 212 on link 202 to the beamformee 208. As an example, the NDP packet 212 may be a sounding packet that includes training symbols (e.g., Long Training Field (LTF) symbols). In such an embodiment, after a second SIFS time 200-2, the beamformer 204 may transmit a trigger packet 214 on link 202 to the beamformee 208, such that the trigger packet 214 may solicit a response from the beamformee 208.

In such an embodiment, once the beamformee 208 has received the NDP Announcement packet 210, the NDP packet 212, and the trigger packet 214, the beamformee may transmit, after a third SIFS time 200-3, a feedback packet 216 on link 202 to the beamformer 204 in response to the received packets from the beamformer 204. As an example, the feedback packet 216 may be a packet that includes two sets of symbols. In such an example, a feedback matrix derived from channel estimates (at the beamformee 208) may be applied to at least one of the two sets of symbols, such that applying the feedback matrix to at least one of the two sets of symbols may involve, e.g., multiplying a Hermitian transpose of the feedback matrix with a (second) training sequence to form a second set of symbols. In an embodiment, applying the feedback matrix to at least one of the two sets of symbols may also involve other similar steps. In an embodiment, the feedback matrix may include right singular vectors derived from the channel estimates. Furthermore, after the beamformer 204 receives the feedback packet 216 on link 202 from the beamformee 208, the beamformer may transmit a steered packet 218 on link 202 to the beamformee 208. As an example, the steered packet 218 may be transmitted via directed beam steering by the beamformer 204 to the beamformee 208, such that beam steering may be performed using right singular vectors derived from channel estimates at the beamformer 204.

Examples of packets that may be exchanged in a beamforming system are described in further detail with reference to FIG. 3 and FIGS. 4A-4B.

Figure 3:
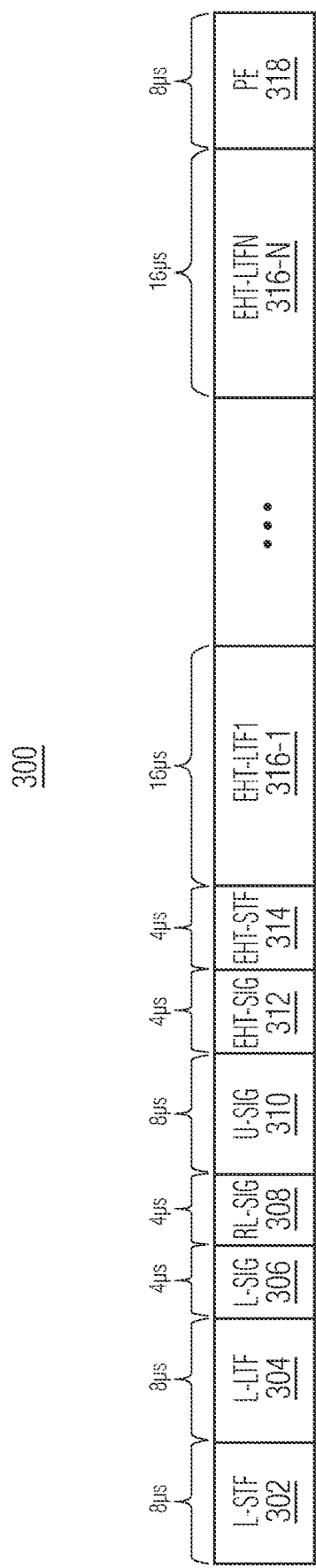
FIG. 3 depicts an example of a packet in accordance with an embodiment of the invention.

FIG. 3 depicts an example of a packet, 300, in accordance with an embodiment of the invention. As an example, the packet 300 may be a sounding packet (e.g., NDP packet) that includes training symbols (e.g., LTF symbols). In some embodiments, the packet 300 may be transmitted by a beamformer (e.g., beamformer 104) to a beamformee (e.g., beamformee 108) in a beamforming system (e.g., beamforming system 100) to help direct beam steering. In an embodiment, the packet 300 may have an EHT packet format, such that the packet 300 may be in accordance with the EHT communication protocol.

With reference to FIG. 3, the packet 300 is shown as including at least nine fields, implemented as a first field, Legacy Short Training Field (L-STF) field 302 that is 8 μs, a second field, Legacy Long Training Field (L-LTF) field 304 that is 8 μs, a third field, Legacy Signal (L-SIG) field 306 that is 4 μs, a fourth field, Repeated L-SIG (RL-SIG) field 308 that is 4 μs, a fifth field, Universal Signal (U-SIG) field 310 that is 8 μs, a sixth field, EHT Signal (EHT-SIG) field 312 that is 4 μs, a seventh field, EHT Short Training Field (EHT-STF) field 314 that is 4 μs, an eighth field, first EHT LTF (EHT-LTF1) field 316-1 that is 16 μs, additional EHT-LTF (EHT-LTFN) field(s) 316-N that may be 16 μs and where N may be an integer greater than one, and a ninth field, Packet Extension (PE) field 318 that may be, e.g., 8 μs. In an embodiment, the training symbols (e.g., LTF symbols) may be implemented via EHT-LTF fields (e.g., EHT-LTF1 field 316-1 and/or EHT-LTFN field(s) 316-N). In such an embodiment, there may be at least as many training symbols as a number of antennas at the beamformer (NTX). For example, if the beamformer has 16 antennas, then the sounding packet (e.g., packet 300) may include 16 training symbols implemented via EHT-LTF fields from an EHT-LTF1 field to an EHT-LTF16 field.

Figure 4A:
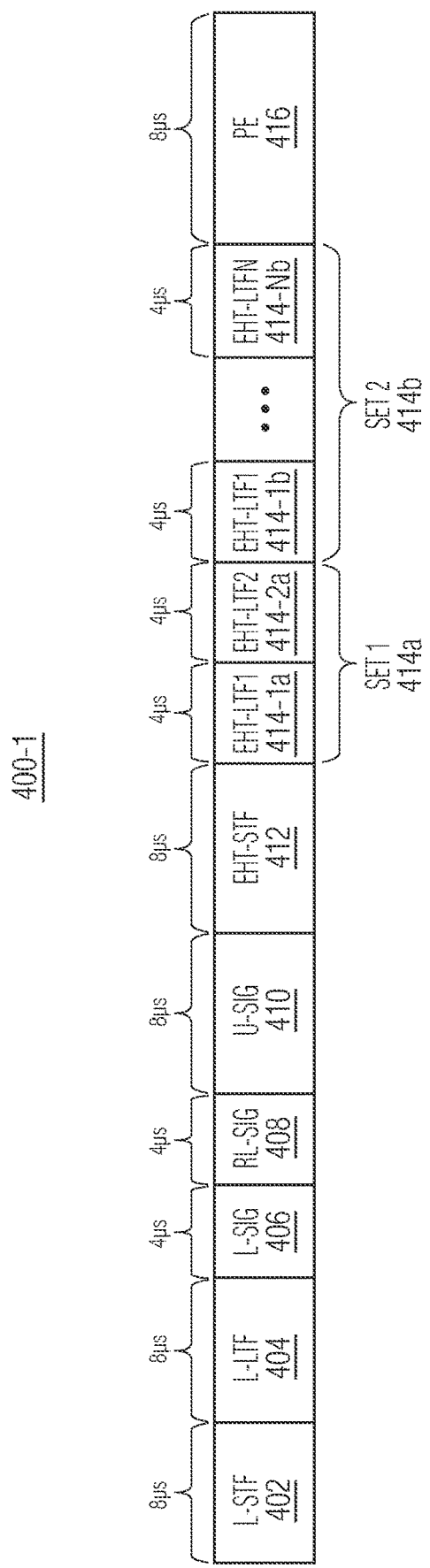
FIG. 4A depicts another example of a packet in accordance with an embodiment of the invention.

FIG. 4A depicts another example of a packet, 400-1, in accordance with an embodiment of the invention. As an example, the packet 400-1 may be a feedback packet (e.g., feedback packet 216) that includes two sets of symbols (e.g., training symbols, LTF symbols, etc.). In such an example, the two sets of symbols included in the packet 400-1 may not be repeated. In some embodiments, the packet 400-1 may be transmitted by a beamformee (e.g., beamformee 108) to a beamformer (e.g., beamformer 104) in a beamforming system (e.g., beamforming system 100) to help direct beam steering. In an embodiment, the packet 400-1 may have an EHT packet format, such that the packet 400-1 may be in accordance with the EHT communication protocol.

With reference to FIG. 4A, the packet 400-1 is shown as including at least ten fields, implemented as a first field, L-STF field 402 that is 8 μs, a second field, L-LTF field 404 that is 8 μs, a third field, L-SIG field 406 that is 4 μs, a fourth field, RL-SIG field 408 that is 4 μs, a fifth field, U-SIG field 410 that is 8 μs, a sixth field, EHT-STF field 412 that is 8 μs, a first set of symbols, set 1 414*a*, that includes a seventh field, EHT-LTF1 field 414-1*a* that is 4 μs, and an eighth field, EHT-LTF2 field 414-2*a* that is 4 μs, a second set of symbols, set 2 414*b*, that includes a ninth field, EHT-LTF1 414-1*b* that is 4 μs, and additional EHT-LTF field(s), EHT-LTFN 414-Nb that may be 4 μs and where N may be an integer greater than one, and a tenth field, PE 416 that may be, e.g., 8 μs.

With further reference to FIG. 4A, a feedback matrix may be computed from derived channel estimates by a beamformee (e.g., beamformee 108) and applied to at least one of the two sets of symbols (e.g., set 1 414*a* and/or set 2 414*b*) included in the packet 400-1. In some embodiments, the first set of symbols (e.g., set 1 414*a*) may include a sequence of training symbols and the second set of symbols (e.g., set 2 414*b*) may include the sequence of training symbols included in the first set of symbols with the applied feedback matrix. In an embodiment, columns of the applied feedback matrix may be an orthonormal spatial spreading matrix. In such an embodiment, the first set of symbols (e.g., set 1 414*a*) may include a sequence of training symbols and the second set of symbols (e.g., set 2 414*b*) may include the sequence of training symbols included in the first set of symbols with the applied orthonormal spatial spreading matrix. In some embodiments, the first set of symbols (e.g., set 1 414*a*) may include a sequence of training symbols and the second set of symbols (e.g., set 2 414*b*) may include a different sequence of training symbols, such that the sequence of training symbols in each set of symbols may have different dimensions. In some embodiments, the beamformee may apply another orthonormal matrix to the first set of symbols and may apply the feedback matrix in addition to the orthonormal matrix to the second set of symbols.

With further reference to FIG. 4A, in such embodiments, the first set of symbols (e.g., set 1 414*a*) may include at least as many training symbols as $N_{SS}$ and the second set of symbols (e.g., set 2 414*b*) may include at least as many training symbols as $N_{Tx}$. For example, if the beamformee has an $N_{SS}$ of two and the beamformer has an $N_{Tx}$ of 16, then the first set of symbols (e.g., set 1 414*a*) may have at least two symbols (e.g., two LTF symbols) and the second set of symbols (e.g., set 2 414*b*) may have at least 16 symbols (e.g., 16 LTF symbols).

Figure 4B:
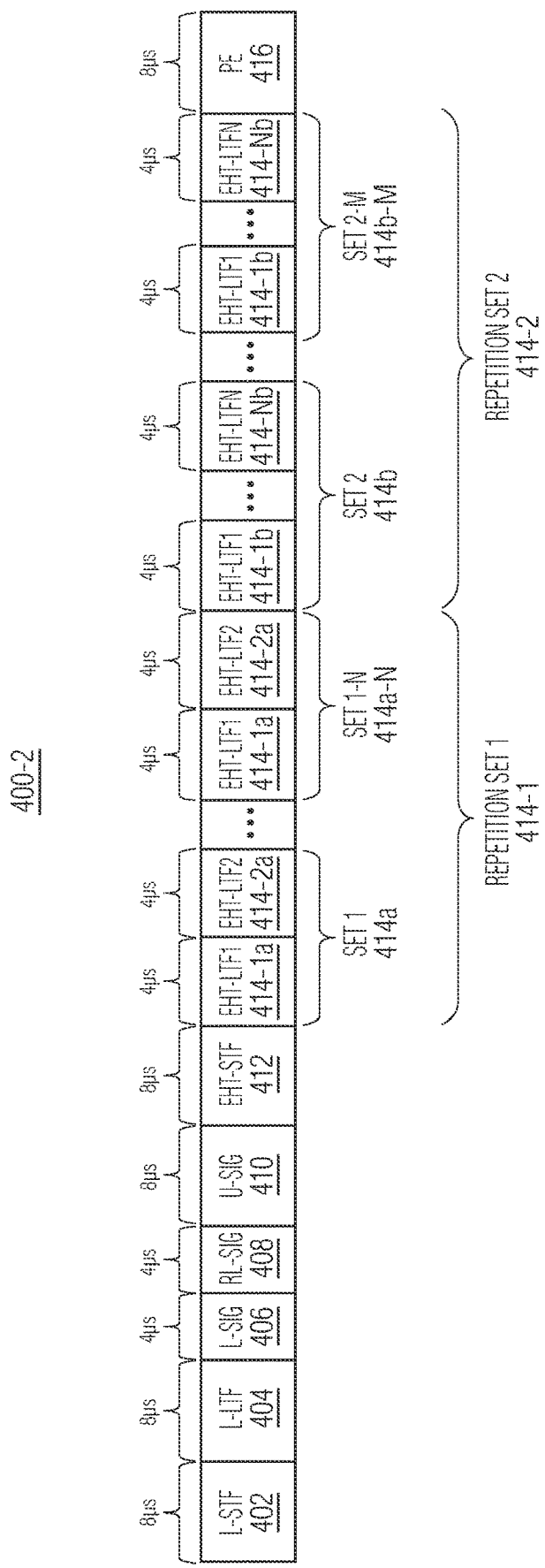
FIG. 4B depicts another example of a packet in accordance with an embodiment of the invention.

FIG. 4B depicts another example of a packet, 400-2, in accordance with an embodiment of the invention. As an example, the packet 400-2 may be a feedback packet (e.g., feedback packet 216) that includes two sets of symbols (e.g., training symbols, LTF symbols, etc.). In such an example, a first set of symbols may be repeated N times and a second set of symbols may be repeated M times, such that N and M may be integers greater than one. In some embodiments, the packet 400-2 may be transmitted by a beamformee (e.g., beamformee 108) to a beamformer (e.g., beamformer 104) in a beamforming system (e.g., beamforming system 100) to help direct beam steering. In an embodiment, the packet 400-2 may have an EHT packet format, such that the packet 400-2 may be in accordance with the EHT communication protocol.

With reference to FIG. 4B, the packet 400-2 is shown as including at least thirteen fields, implemented as a first field, L-STF field 402 that is 8 μs, a second field, L-LTF field 404 that is 8 μs, a third field, L-SIG field 406 that is 4 μs, a fourth field, RL-SIG field 408 that is 4 μs, a fifth field, U-SIG field 410 that is 8 μs, and a sixth field, EHT-STF field 412 that is 8 μs. In an embodiment, the packet 400-2 includes a first repetition set, repetition set 1 414-1, that includes a first set of symbols, set 1 414*a*, that includes a seventh field, EHT-LTF1 field 414-1*a* that is 4 μs, and an eighth field, EHT-LTF2 field 414-2*a* that is 4 μs, and a repeated first set of symbols, set 1-N 414*a*-N that includes a ninth field, EHT-LTF1 field 414-1*a* that is 4 μs, and a tenth field, EHT-LTF2 field 414-2*a* that is 4 μs. In an embodiment, the packet includes a second repetition set, repetition set 2 414-2, that includes a second set of symbols, set 2 414*b*, that includes an eleventh field, EHT-LTF1 414-1*b* that is 4 μs, and additional EHT-LTF field(s), EHT-LTFN 414-Nb that may be 4 μs and where N may be an integer greater than one, and a repeated second set of symbols, set 2-M 414*b*-M, that includes a twelfth field, EHT-LTF1 414-1*b* that is 4 μs, and additional EHT-LTF field(s), EHT-LTFN 414-Nb that may be 4 μs and where N may be an integer greater than one. In such an embodiment, the packet 400-2 also includes a thirteenth field, PE 416 that may be, e.g., 8 μs. As an example, N of set 1-N 414*a*-N may be a different integer from N of EHT-LTFN 414-Nb in set 2 414*b* and N of EHT-LTFN 414-Nb in set 2-M 414*b*-M.

With further reference to FIG. 4B, the fields included in set 1-N 414*a*-N and set 2-M 414*b*-M may each be repetitions (e.g., be similar to, contain the same contents, be the same as, etc.) of the fields included in set 1 414*a* and set 2 414*b*, respectively. In some embodiments, a feedback matrix may be computed from derived channel estimates by a beamformee (e.g., beamformee 108) and applied to at least one of the two sets of symbols (e.g., set 1 414*a* (and set 1-N 414*a*-N) and/or set 2 414*b* (and set 2-M 414*b*-M)) included in the packet 400-2. In some embodiments, the first set of symbols (e.g., set 1 414*a* (and set 1-N 414*a*-N)) may include a sequence of training symbols and the second set of symbols (e.g., set 2 414*b* (and set 2-M 414*b*-M)) may include the sequence of training symbols included in the first set of symbols with the applied feedback matrix. In an embodiment, columns of the applied feedback matrix may be an orthonormal spatial spreading matrix. In such an embodiment, the first set of symbols (e.g., set 1 414*a* (and set 1-N 414*a*-N)) may include a sequence of training symbols and the second set of symbols (e.g., set 2 414*b* (and set 2-M 414*b*-M)) may include the sequence of training symbols included in the first set of symbols with the applied orthonormal spatial spreading matrix. In some embodiments, the beamformee may apply another orthonormal matrix to the first set of symbols (e.g., set 1 414*a* (and set 1-N 414*a*-N)) and may apply the feedback matrix in addition to the orthonormal matrix to the second set of symbols (e.g., set 2 414*b* (and set 2-M 414*b*-M)). In such an embodiment, the orthonormal matrix may be a steering matrix that may be computed implicitly with respect to an up-link (UL) channel. In some embodiments, the first set of symbols (e.g., set 1 414a (and set 1-N 414a-N)) may include a sequence of training symbols and the second set of symbols (e.g., set 2 414b (and set 2-M 414b-M)) may include a different sequence of training symbols, such that the sequence of training symbols in each set of symbols may have different dimensions.

With further reference to FIG. 4B, in such embodiments, the first set of symbols (e.g., set 1 414a (and set 1-N 414a-N)) may include at least as many training symbols as $N_{SS}$ and the second set of symbols (e.g., set 2 414b (and set 2-M 414b-M)) may include at least as many training symbols as NTX. For example, if the beamformee has an $N_{SS}$ of two and the beamformer has an NTX of 16, then the first set of symbols (e.g., set 1 414a (and set 1-N 414a-N)) may have at least two symbols (e.g., two LTF symbols) and the second set of symbols (e.g., set 2 414b (and set 2-M 414b-M)) may have at least 16 symbols (e.g., 16 LTF symbols).

A functional block diagram that depicts operations at a beamformer and a beamformee while exchanging packets to direct beam steering is described in further detail with reference to FIG. 5.

Figure 5:
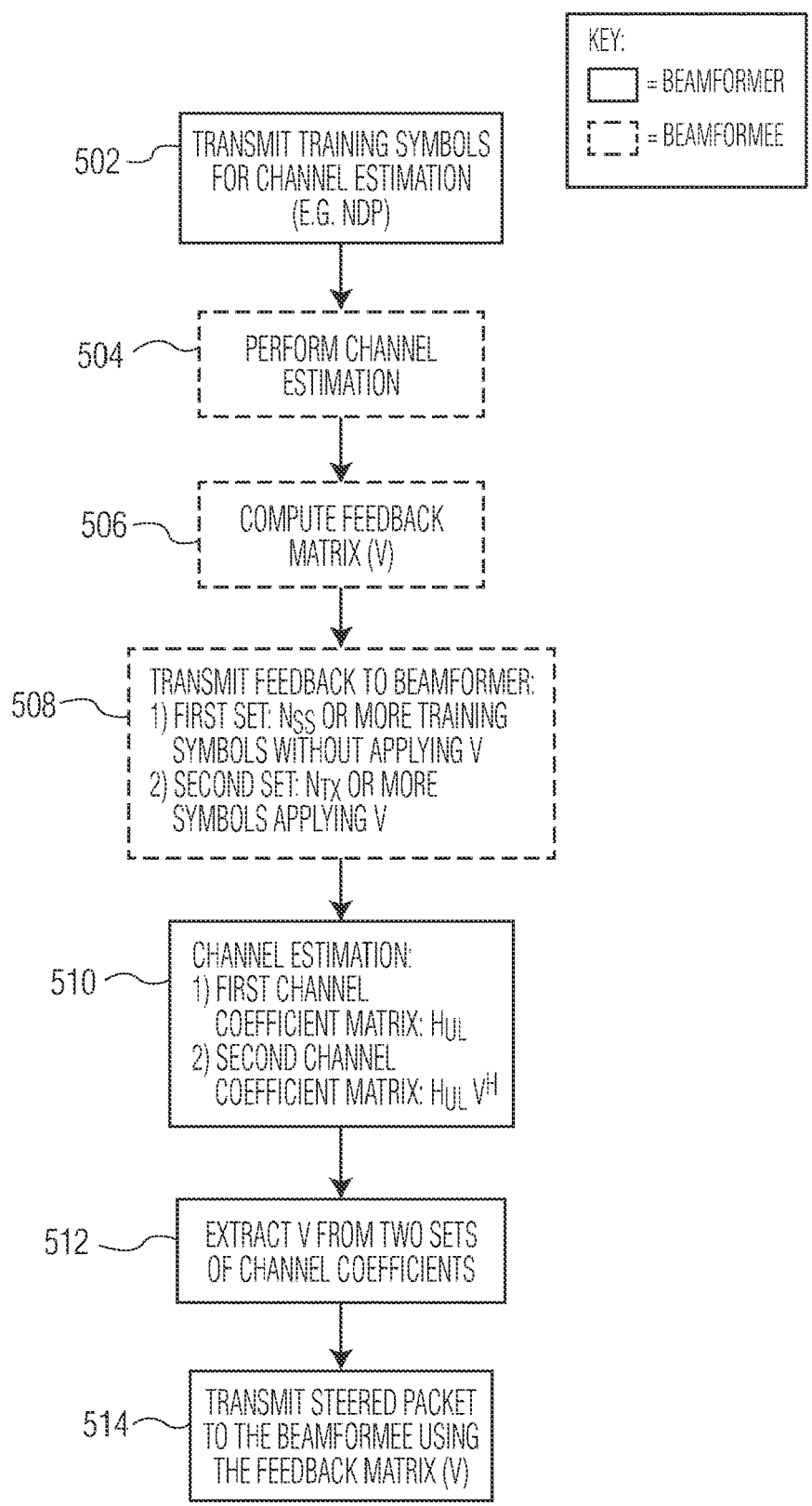
FIG. 5 depicts a functional block diagram of operations at a beamformer and a beamformee while exchanging packets in accordance with an embodiment of the invention.

FIG. 5 depicts a functional block diagram, 500, of operations at a beamformer and a beamformee while exchanging packets in accordance with an embodiment of the invention. At block 502, a beamformer (e.g., beamformer 104) may transmit training symbols (e.g., LTF symbols) to a beamformee (e.g., beamformee 108) for channel estimation via a sounding packet (e.g., packet 300). In an embodiment, the beamformee may receive the sounding packet that includes the training symbols, and at block 504, the beamformee may perform channel estimation. As an example, performing channel estimation at the beamformee may involve deriving channel estimates ($H_{DL}$) from the training symbols included in the packet to compute a feedback matrix (V). In such an example, V may be a matrix formed by right singular vectors of, e.g., $H_{DL}$, with a dimension of $N_{Tx} \times N_{Tx}$. In an embodiment, $H_{DL}$ may represent a down-link (DL) channel coefficient matrix from beamformer to beamformee with a dimension of $N_{Rx} \times N_{Tx}$, such that $N_{Rx}$ represents a number of antennas at a beamformee. At block 506, the beamformee may compute V (e.g., a steering matrix) from $H_{DL}$. As an example, V may include right singular vectors derived from $H_{DL}$. At block 508, the beamformee may transmit feedback to the beamformer via a packet (e.g., packet 400-1 or packet 400-2) that includes two sets of symbols. As an example, the packet that includes two sets of symbols may use $N_{ss}$ or more training symbols without applying V for a first set of symbols and may use $N_{Tx}$ or more symbols and apply V for a second set of symbols.

In an embodiment, the beamformer may receive the packet that includes the two sets of symbols from the beamformee, and at block 510, the beamformer may perform channel estimation. As an example, performing channel estimation at the beamformer may involve computing two sets of channel coefficients from the packet that includes the two sets of symbols. In an embodiment, a first set of channel coefficients may be derived from the first set of symbols and may be represented by $H_{UL}$, such that $H_{UL}$ represents a UL channel coefficient matrix from the beamformee to the beamformer with a dimension of $N_{Tx} \times N_{Rx}$. Additionally, in such an embodiment, a second set of channel coefficients may be derived from the second set of symbols and may be represented by $H_{UL}V^H$, such that $V^H$ represents a conjugate transpose (e.g., Hermitian transpose) of V.

At block 512, the beamformer may recover V by extracting V from the two sets of channel coefficients. As an example, the beamformer may recover V using the two sets of channel coefficients by removing $H_{UL}$. In such an example, recovering V using the two set of channel coefficients may involve computing a first orthonormal matrix ($Q_1$) by deriving a first Hermitian transpose (($H_{UL})^H$) of the first channel coefficient matrix ($H_{UL}$) from at least one of the two sets of channel coefficients, then deriving a first QR decomposition (Q) of the first Hermitian transpose (($H_{UL})^H$) to determine the first orthonormal matrix ($Q_1=Q$). In addition, in such an example, recovering V using the two sets of channel coefficients may involve computing a second orthonormal matrix ($Q_2$) by deriving a second Hermitian transpose ($V(H_{UL})^H$) of the second channel coefficient matrix ($H_{UL}V^H$) from at least one of the two sets of channel coefficients, then deriving a second QR decomposition (VQ) of the second Hermitian transpose ($V(H_{UL})^H$) to determine the second orthonormal matrix ($Q_2=VQ$). Furthermore, in such an example, a third matrix with orthogonal columns may be derived from the first orthonormal matrix ($Q_1=Q$) and the second orthonormal matrix ($Q_2=VQ$), such that the third matrix may be the feedback matrix ($V=Q_2(Q_1)^H$). In an embodiment, the feedback matrix ($V=Q_2(Q_1)^H$) may be an estimated feedback matrix. At block 514, the beamformer may transmit a steered packet (e.g., steered packet 218) to the beamformee using the feedback matrix ($V=Q_2(Q_1)^H$), such that the feedback matrix ($V=Q_2(Q_1)^H$) helps direct beam steering to the beamformee.

With reference to FIG. 5, in an alternative embodiment, at block 508, the beamformee may apply another orthonormal matrix (e.g., Q) to the first set of symbols and may apply the feedback matrix in addition to the orthonormal matrix (e.g., $QV^H$) to the second set of symbols. In some embodiments, at block 508, the beamformee may transmit at least one data symbol that includes additional beamforming information (e.g., sub-stream signal-to-noise ratio (SNR)). In an alternative embodiment, at block 512, the beamformer may select corresponding columns from the second orthonormal matrix ($Q_2$) and may post-multiply a sub-matrix (e.g., $P_2$) formed by the corresponding columns from the second orthonormal matrix ($Q_2$) with the first Hermitian transpose ($Q_1^H$) of the first orthonormal matrix ($Q_1$) to derive the third matrix ($P_2Q_1^H$) with orthogonal columns.

An example of operations between a beamformer and a beamformee while exchanging packets to direct beam steering is described in further detail with reference to FIG. 6.

Figure 6:
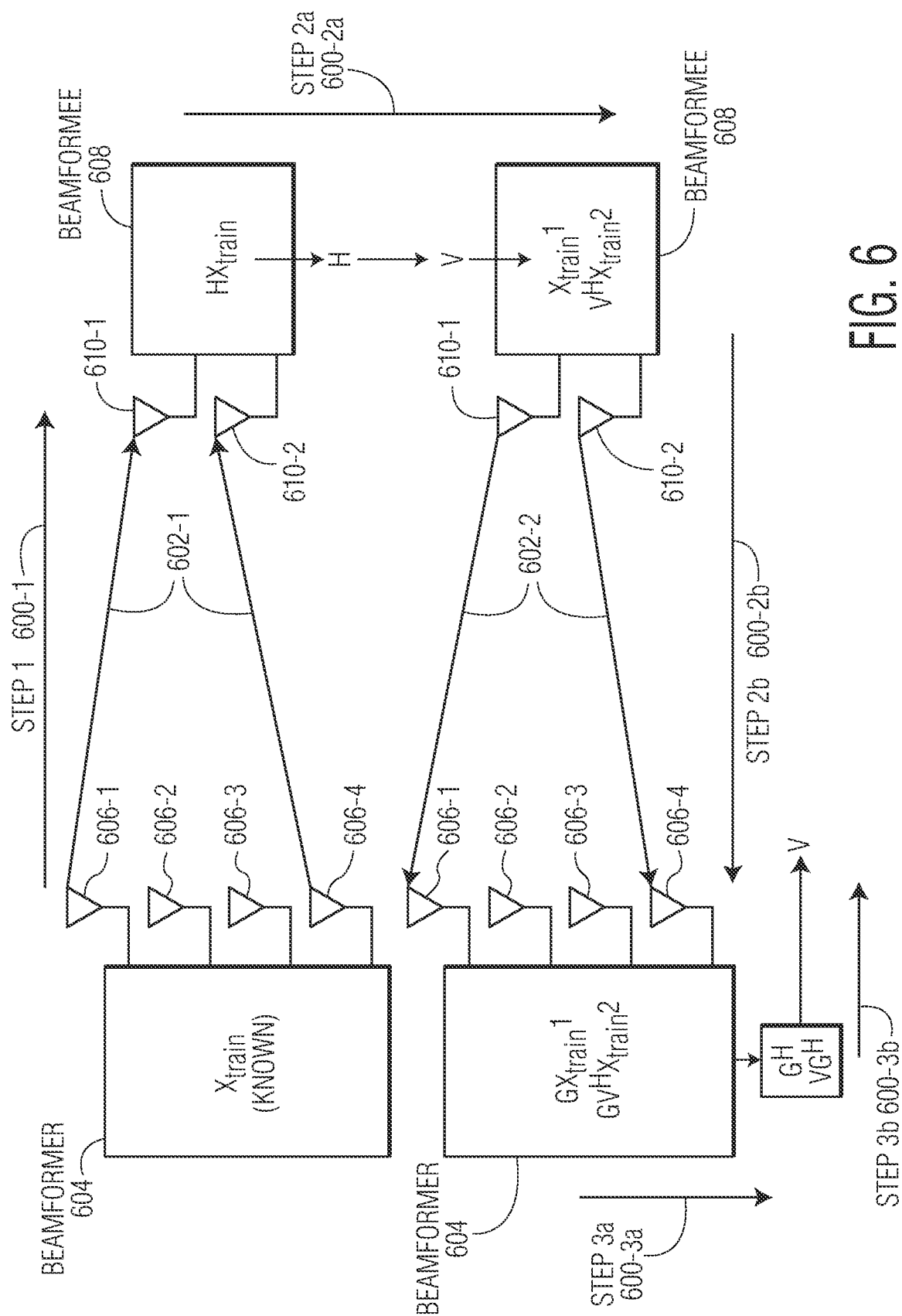
FIG. 6 illustrates an example of operations between a beamformer and a beamformee while exchanging packets to direct beam steering in accordance with an embodiment of the invention.

FIG. 6 illustrates an example of operations between a beamformer and a beamformee while exchanging packets to direct beam steering in accordance with an embodiment of the invention. In particular, the operations between a beamformer 604 that includes four beamformer antennas (e.g., beamformer antenna-1 606-1, beamformer antenna-2 606-2, beamformer antenna-3 606-3, and beamformer antenna-4 606-4) and a beamformee 608 that includes two antennas (e.g., beamformee antenna-1 610-1 and beamformee antenna-2 610-2) may involve three steps, implemented as step 1 600-1, step 2a 600-2a, step 2b 600-2b, step 3a 600-3a, and step 3b 600-3b. In such an embodiment, the beamformer 604 and the beamformee 608 may communicate via eight transmission paths (not shown).

In an embodiment, step 1 600-1 may involve implementing block 502 of the functional block diagram 500, such that the beamformer 604 transmits a sounding packet (e.g., packet 300) that includes symbols, e.g., training symbols (shown by $X_{train}$ (known)), to the beamformee 608 via a first beam direction 602-1. In an embodiment, step 2a 600-2a may involve implementing block 504 of the functional block diagram 500, such that the beamformee 608 performs channel estimation by deriving channel estimates (e.g., $H_{DL}$) (shown by H) from the DL transmission of training symbols (shown by $HX_{train}$) from the beamformer 604. In such an embodiment, step 2a 600-2a may also involve implementing block 506 of the functional block diagram 500, such that the beamformee 608 may compute a feedback matrix (shown by V) by, for example, taking a singular value decomposition of the derived DL channel estimates (e.g., H).

In an embodiment, step 2b 600-2b may involve implementing block 508 of the functional block diagram 500, such that the beamformee 608 may transmit a packet (e.g., packet 400-1 or packet 400-2) that includes two sets of symbols to the beamformer 604 via a second beam direction 602-2. In such an embodiment, the two sets of symbols may include a first set of symbols that may include a sequence of training symbols (shown by $X_{train}^1$) and a second set of symbols that may include the sequence of training symbols included in the first set of symbols with the feedback matrix (shown by $V^H X_{train}^2$). In some embodiments, the first set of symbols may include a sequence of training symbols and the second set of symbols may include a different sequence of training symbols, such that the sequence of training symbols in each set of symbols may have different dimensions.

In an embodiment, step 3a 600-3a may involve implementing block 510 of the functional block diagram 500, such that the beamformer 604 may receive the UL packet that includes the two sets of symbols from the beamformee 608 and may perform channel estimation by computing two sets of channel coefficients from UL channel estimates (e.g., $H_{UL}$) derived from the two sets of symbols included in the packet. For example, a first set of UL channel estimates (shown by $GX_{train}^1$) may be derived from the first set of symbols ($X_{train}^1$) and a second set of UL channel estimates (shown by $GV^H X_{train}^2$) may be derived from the second set of symbols ($V^H X_{train}^2$). In such an example, the beamformer 604 may compute a first set of channel coefficients (shown by $G^H$) and a second set of channel coefficients (shown by $VG^H$) from the first set of UL channel estimates (shown by $GX_{train}^1$) and the second set of UL channel estimates (shown by $GV^H X_{train}^2$), respectively.

In an embodiment, step 3b 600-3b may involve implementing block 512 of the functional block diagram 500, such that the beamformer 604 may extract a feedback matrix (shown by V) from the two sets of channel coefficients. In an embodiment, the feedback matrix may be a matrix formed by right singular vectors of, e.g., $H_{DL}$, with a dimension of $N_{Tx} \times N_{SS}$. As an example, the feedback matrix may be a sub-matrix of the matrix formed by the right singular vectors of $H_{DL}$. In such an embodiment, the beamformer 604 may direct beam steering to the beamformee 608 in subsequent steered packet transmissions (not shown) using the right singular vectors derived from the channel estimates, such that the subsequent transmissions may involve implementing block 514 of the functional block diagram 500.

Figure 7:
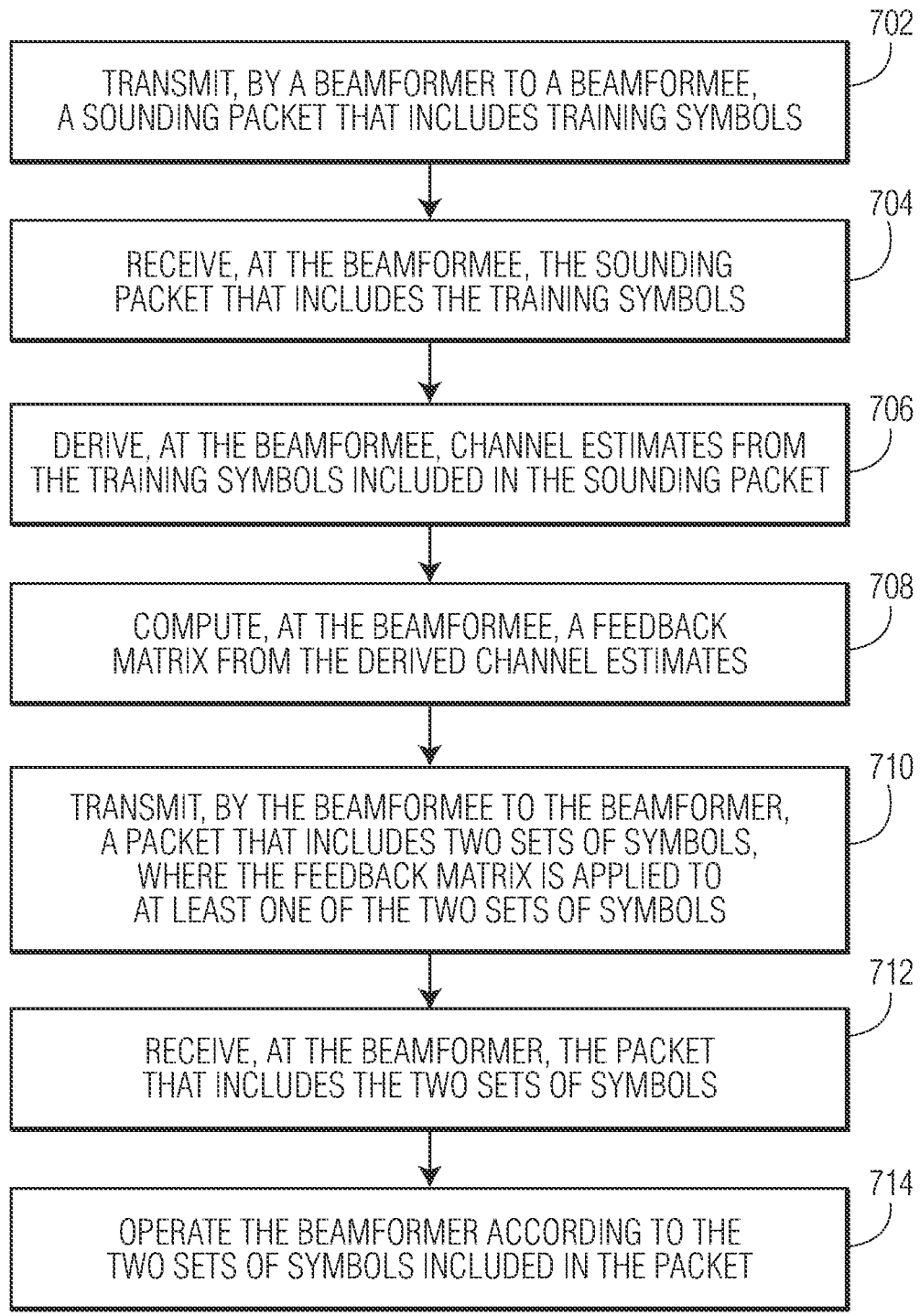
FIG. 7 illustrates a flow diagram of a technique for beamforming in accordance with an embodiment of the invention.

FIG. 7 illustrates a flow diagram of a technique for beamforming in accordance with an embodiment of the invention. At block 702, a beamformer may transmit to a beamformee, a sounding packet that includes training symbols. At block 704, the beamformee may receive the sounding packet that includes the training symbols. At block 706, the beamformee may derive channel estimates from the training symbols included in the sounding packet. At block 708, the beamformee may compute a feedback matrix from the derived channel estimates. At block 710, the beamformee may transmit to the beamformer, a packet that includes two sets of symbols, where the feedback matrix is applied to at least one of the two sets of symbols. At block 712, the beamformer may receive the packet that includes the two sets of symbols. At block 714, the beamformer may operate according to the two sets of symbols included in the packet.

With reference to FIG. 5, FIG. 6, and/or FIG. 7, in some embodiments, the techniques performed by the beamformer (e.g., beamformer 104) and/or the beamformee (e.g., beamformee 108) with respect to the steps and/or functional blocks for beam steering in a beamforming system (e.g., beamforming system 100) may be implemented via a processor and/or controller included in a device (e.g., beamformer 104 and/or beamformee 108). In some embodiments, the processor that performs the steps and/or functional blocks for beam steering in the beamforming system may be operably connected to the controller included in the device(s). As an example, the controller may perform functionalities previously described with reference to FIG. 5, FIG. 6, and/or FIG. 7.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for beamforming, the method comprising:
   transmitting, by a beamformer to a beamformee, a sounding packet that includes training symbols;
   receiving, at the beamformee, the sounding packet that includes the training symbols;

deriving, at the beamformee, channel estimates from the training symbols included in the sounding packet;

computing, at the beamformee, a feedback matrix from the derived channel estimates;

transmitting, by the beamformee to the beamformer, a packet that includes two sets of symbols, wherein the feedback matrix is applied to at least one of the two sets of symbols;

receiving, at the beamformer, the packet that includes the two sets of symbols; and operating the beamformer according to the two sets of symbols included in the packet.

2. The method of claim 1, wherein the sounding packet includes at least as many training symbols as a number of antennas at the beamformer ($N_{Tx}$).

3. The method of claim 1, wherein the feedback matrix includes right singular vectors derived from the channel estimates.

4. The method of claim 3, wherein the beamformer directs beam steering to the beamformee using the right singular vectors derived from the channel estimates.

5. The method of claim 1, wherein the packet that includes the two sets of symbols includes:
a first set of symbols that include a sequence of training symbols; and
a second set of symbols that include the sequence of training symbols included in the first set of symbols with the applied feedback matrix.

6. The method of claim 5, wherein columns of the applied feedback matrix are an orthonormal spatial spreading matrix, and wherein the beamformee applies another orthonormal matrix to the first set of symbols and applies the feedback matrix in addition to the orthonormal matrix to the second set of symbols.

7. The method of claim 6, wherein the first set of symbols includes at least as many training symbols as a number of spatial streams ($N_{SS}$) and the second set of symbols includes at least as many training symbols as $N_{Tx}$.

8. The method of claim 1, wherein columns of the applied feedback matrix are an orthonormal spatial spreading matrix.

9. The method of claim 8, wherein the packet that includes the two sets of symbols includes:
a first set of symbols that include a sequence of training symbols; and
a second set of symbols that include the sequence of training symbols included in the first set of symbols with the applied orthonormal spatial spreading matrix.

10. The method of claim 9, wherein the beamformee applies another orthonormal matrix to the first set of symbols and applies the feedback matrix in addition to the orthonormal matrix to the second set of symbols.

11. The method of claim 10, wherein the first set of symbols includes at least as many training symbols as $N_{SS}$ and the second set of symbols includes at least as many training symbols as $N_{Tx}$.

12. The method of claim 1, wherein the beamformer computes two sets of channel coefficients from the packet that includes the two sets of symbols.

13. The method of claim 12, wherein the beamformer recovers the feedback matrix using the two sets of channel coefficients.

14. The method of claim 13, wherein recovering the feedback matrix using the two sets of channel coefficients includes:

computing a first orthonormal matrix by:
deriving a first Hermitian transpose of a first channel coefficient matrix from at least one of the two sets of channel coefficients;
deriving a first QR decomposition of the first Hermitian transpose to determine the first orthonormal matrix;
computing a second orthonormal matrix by:
deriving a second Hermitian transpose of a second channel coefficient matrix from at least one of the two sets of channel coefficients;
deriving a second QR decomposition of the second Hermitian transpose to determine the second orthonormal matrix; and
deriving a third matrix with orthogonal columns from the first orthonormal matrix and the second orthonormal matrix, wherein the third matrix is the feedback matrix.

15. The method of claim 14, wherein the beamformer selects corresponding columns from the second orthonormal matrix and post-multiplies a sub-matrix formed by the corresponding columns from the second orthonormal matrix with the first Hermitian transpose of the first orthonormal matrix to derive the third matrix with orthogonal columns.

16. The method of claim 1, wherein the training symbols included in the packet are Long Training Field (LTF) symbols.

17. The method of claim 9, wherein the first set of symbols is repeated N times and the second set of symbols is repeated M times, wherein N and M are integers greater than one.

18. The method of claim 1, wherein the beamformee transmits at least one data symbol that includes at least one sub-stream signal-to-noise ratio (SNR).

19. A beamforming system, the beamforming system comprising:
a beamformer including a processor configured to:
transmit a sounding packet that includes training symbols;
receive a packet that includes two sets of symbols;
operate according to the two sets of symbols included in the packet;
a beamformee including a processor configured to:
receive the sounding packet that includes the training symbols;
derive channel estimates from the training symbols included in the sounding packet;
compute a feedback matrix from the derived channel estimates; and
transmit the packet that includes the two sets of symbols, wherein
the feedback matrix is applied to at least one of the two sets of symbols.

20. A device, the device comprising:
a processor configured to:
operate as a beamformer, wherein operating as a beamformer involves:
transmitting a sounding packet that includes training symbols;
receiving a packet that includes two sets of symbols;
operating according to the two sets of symbols included in the packet; and
operate as a beamformee, wherein operating as a beamformee involves:
receiving the sounding packet that includes the training symbols;
deriving channel estimates from the training symbols included in the sounding packet;

computing a feedback matrix from the derived channel estimates; and transmitting the packet that includes the two sets of symbols, wherein the feedback matrix is applied to at least one of the two sets of symbols.

* * * * *